March 6, 1945.  H. SMITH, JR  2,371,073
PHOTOGRAPHIC PROCESSING APPARATUS
Filed Oct. 8, 1943  2 Sheets-Sheet 2
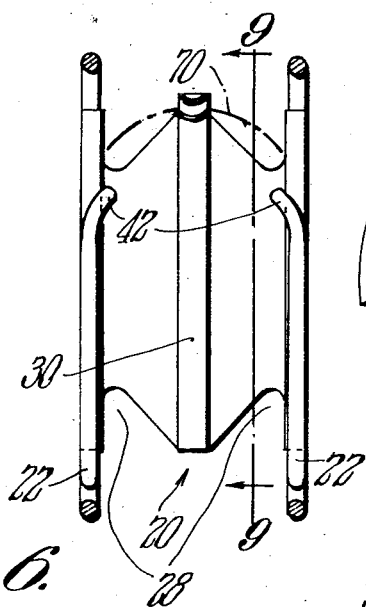
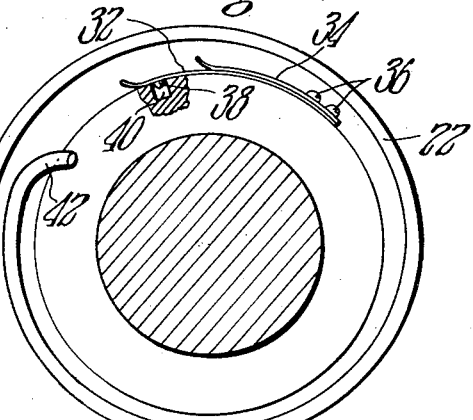
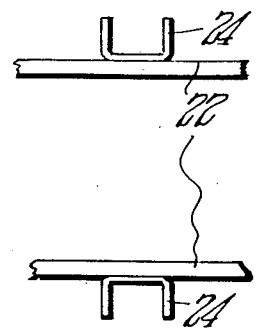
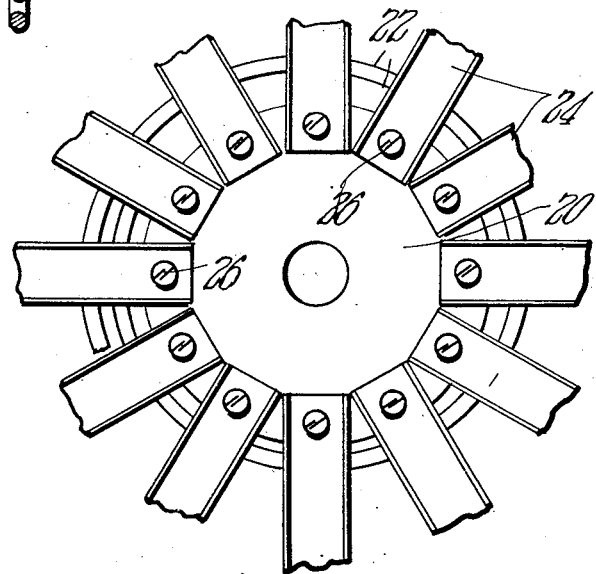
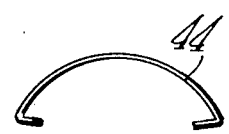
INVENTOR.
BY Hinsdale Smith, Jr.
Walter C. Ross, Attorney.

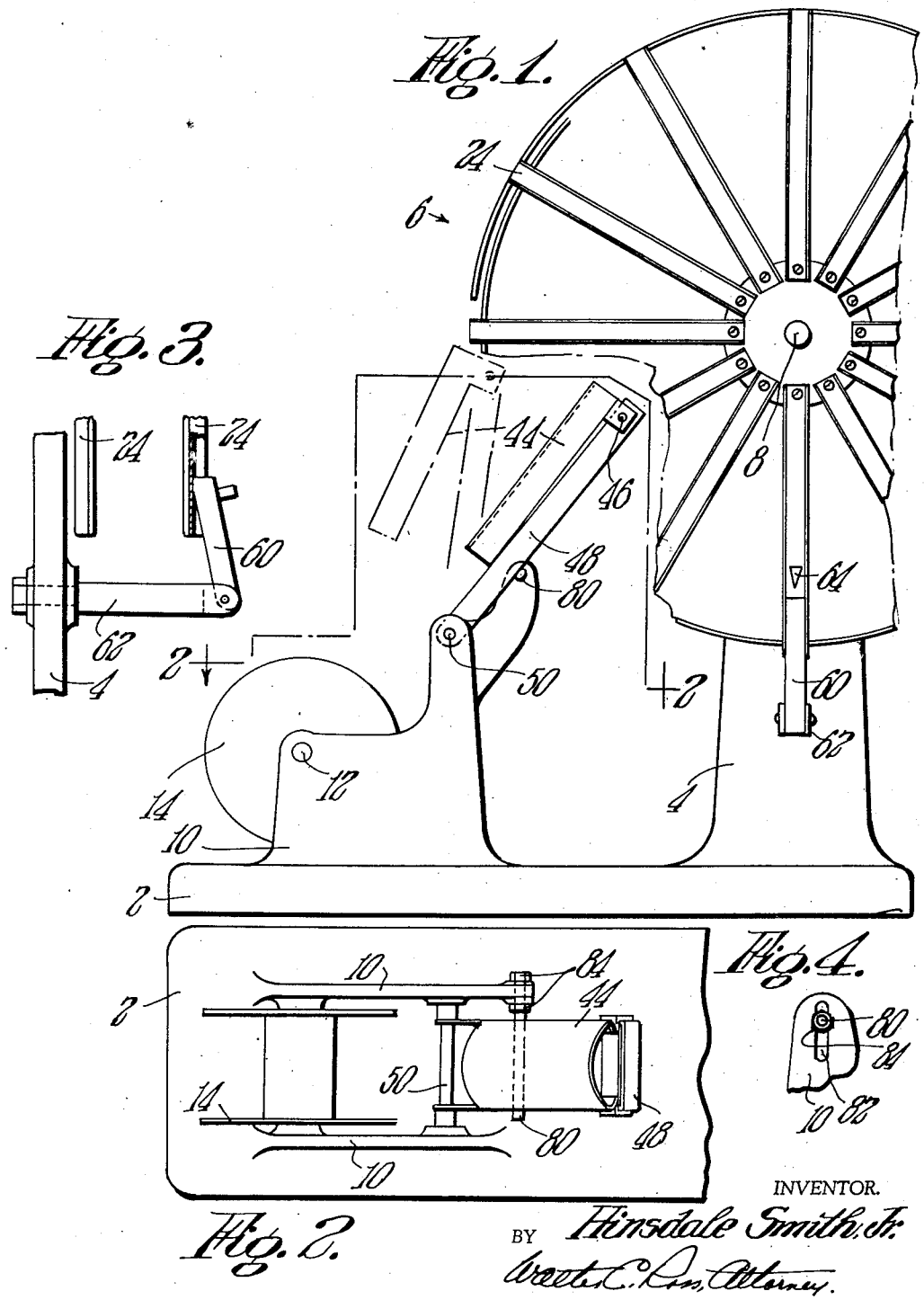

Patented Mar. 6, 1945

2,371,073

UNITED STATES PATENT OFFICE 2,371,073

PHOTOGRAPHIC PROCESSING APPARATUS

Hinsdale Smith, Jr., Suffield, Conn.

Application October 8, 1943, Serial No. 505,498

3 Claims. (Cl. 242—55)

This invention relates to improvements in photographic apparatus and is directed more particularly to a reel for processing film or other photographic material and cooperating means for loading the same.

The principal objects of the invention are directed in the provision of photographic apparatus for processing strip film or the like and broadly includes a novel reel for receiving long and relatively narrow strip material such as a film, and means for loading the same into the reel.

Developing apparatus for the processing of strip material is known, but prior art apparatus is adapted for relatively short strips as a few feet, whereas the apparatus of this application is adapted for much longer strips, as 50 or 100 feet or even longer strips.

The apparatus is characterized by simplicity of form and ease in manipulation and numerous and various novel objects and advantages of the invention will be hereinafter more fully observed in connection with the accompanying description of the invention in the form at preset preferred. It will be understood that various changes and modifications may be made in the form of the apparatus without departing from the spirit and scope of the invention.

In the drawings:

Fig. 1 is a side elevational view of the apparatus of the invention;

Fig. 2 is a plan view on the line 2—2 of Fig. 1;

Fig. 3 is a side elevational view of one form of locking means for the reel;

Fig. 4 is a front elevational view of means for supporting the strip loading means;

Fig. 5 is an enlarged partial plan view of a side of the reel of the apparatus;

Fig. 6 is a partial edge view of the reel to show certain features of construction;

Fig. 7 is a sectional view through the film loading guide of the apparatus;

Fig. 8 is an edge elevational view of the hub or core of the reel; and

Fig. 9 is a sectional elevational view on the line 9—9 of Fig. 8.

Referring now to the drawings more in detail, the invention will be fully described.

A base 2 is provided which may be of any form and a standard 4 or other means, for rotatably supporting a reel 6, is associated therewith.

The reel 6 is rotatable on a shaft or arbor 8 and it may be rotated manually or by some rotating means that may be provided. The shaft or arbor may be located at various distances from the base or it may be shiftable for supporting reels of different diameters for strips of different lengths.

Bearings 10 support a shaft or arbor 12 on which is rotatable a spool 14 for carrying a relatively long and narrow strip of film or other material which is to be loaded into the reel 6. The spool 14 may take any form desired.

The reel 6 in general is similar to that disclosed in U. S. Letters Patent 2,073,978 issued to me on March 16, 1937, in that it has two side members in the form of spirals. Otherwise the reel of this application has certain novel features of construction to adapt it for use in connection with the other components of the apparatus and to make it possible for the reel to hold film strips that are relatively narrow and considerably longer than that for which the reel of the before mentioned patent is adapted.

A central hub 20 is provided which may be of metal, preferably, however, such metal will be used as is not injuriously effected by the action of photographic chemicals.

Spirals 22 formed from wire which may be of similar material have their spaced convolutions secured to radially extending spoke members 24. The inner ends of the members 24 are disposed on opposite sides or ends of the hub member 20 and may be secured thereto in any convenient manner, as by screws 26 or the like. There may be as many of the spoke members as may be desired.

The members 24 are preferably of channel shape and their sides overlying the convolutions of the spiral are welded thereto. The cross section or thickness of the members 24 at their point of contact or weld to the wire of the spiral is preferably considerably less or thinner, or at least does not exceed the cross section or thickness of the spiral forming wire. This is to eliminate distortion of the spirally arranged members as it is desired that the convolutions of the spirals be maintained in the same plane.

With the members 24 thus secured to the convolutions of the spiral the turns thereof are held in the desired relationship and with said members 24 secured to the hub 20 there is provided a strong durable reel structure wherein the spirals provide spiral grooves on opposite sides of the reel in which opposite longitudinal edges of a film strip or the like are receivable.

As shown in Figs. 7 and 8 the hub 20 is circumferentially grooved at 28 on opposite sides of a central circumferential portion 30.

A member 32 of spring-like material and there may be a shorter similar member 34 are secured to the central part 30 of the hub by screws 36 or other means. A projection 38 on the member 34 overlies a cavity 40 provided in the hub. The parts are arranged so that the end portion of a film strip may be inserted beneath and releasably and yieldingly gripped between the free end of member 32 and the hub.

The inner end portions 42 of the spirals at opposite sides of the hub are curved inwardly towards one another and more or less into the grooves 28 of the hub, as shown in Figs. 7 and 8.

A loading guide includes a film receiving and guiding member 44 that is pivoted for swinging movements at 46 to a U shaped lever 48. Said lever 48 is pivoted at 50 to the frame parts 10 for swinging movements.

The member 44 is curved transversely as shown in Fig. 6 for transversely curving a strip as it passes therethrough thus facilitating the passage of a strip between the spirals of the reel, the distance between said spirals being less than the width of the strip in its non-curved relation.

When it is desired to attach a film strip to the hub of the reel for loading the strip into the reel said reel is preferably releasably held against rotation and in such a position that the clip 32 is located so as to receive the end portion of the film strip passing through and extending from the end of the guide 44. Various means may accomplish this but for illustrative purposes there is shown a dog 60 that is pivoted on a member 62 carried by the part 4. The dog is receivable in one of the reel members 24 and a certain member 24 may be marked as at 64, so that with the dog in engagement therewith the clip 32 of the hub is in proper position for receiving the extremity of a film strip.

With the reel so releasably locked against rotation and the film strip extending from the spool 14 and passing through member 44 the extremity of the strip is inserted beneath clip 32, whereby the end of the strip is releasably held by the hub. The guide member 44 being curved as it is, the strip is curved transversely thereby so that it passes between the spirals to the clip 32 with its side edges at its extremity disposed in the grooves 28 of the hub. The curvature of the end of the film where engaged by the clip is indicated by the dot-dash line 70 in Fig. 7.

The end of the film strip being curved at the clip, its side edges tend to override or overlie the inwardly curving ends 42 of the spirals so that when the reel is rotated (clockwise in the drawings) said ends 42 lift the side edges of the film upwardly and outwardly into the grooves between the innermost and next adjacent convolutions of the spirals. As the reel is continued to be rotated since the end of the film strip is held by the clip it is pulled through the guide 44. The guide maintains the transverse curvature of the film so that it passes between the spirals of the reel and flattens out at the point of tangency of the strip and spiral grooves whereby its edges are received in said spiral grooves.

The parts are arranged and adapted so that as the film strip passing through member 44 is reeled up and the diameter of the film on the reel increases the member 44 swings on the member 48 and the latter swings on its pivot 50. This facilitates the guide 44 accommodating itself to the straight line of the strip as it passes from the spool 14 into the reel. That is, the film strip is free to assume a straight line from its points of tangency relative to the spool and the grooves of the reel.

At the same time, the parts are so arranged that as the winding progresses the distance between the end of member 44 adjacent the axis of rotation of the reel and the point of tangency of the film strip and reel grooves is substantially maintained. At least the distance is maintained to the extent the strip is sufficiently curved by member 44 so that it may pass between the spirals of the reel and then flatten out readily at the point of tangency of the strip and reel grooves whereby its marginal edges may be received in the spiral grooves. The guide and associated parts are constructed and arranged for the automatic guiding and curving of the film strip between end of guide 44 and spiral grooves of the reel in such a way that at the point of tangency of the strip and grooves of the reel where it is to be received, the strip may flatten out at that point so that its edges are received in the grooves.

A stop means is provided for the member 48 to rest upon and includes a rod member 80 extending through a slot 82 of one of the members 10. Nuts 84 in threaded engagement with member 80 are provided to lock the said member in various positions of adjustment. By this or some other suitable means the member 48 is positioned so that the guide member 44 accurately directs the end portion of a strip to the clip 32 when the reel is in releasably locked position.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. Apparatus for processing strips of photographic film comprising in combination, a support, a reel rotatable on said support for receiving and winding up a film strip, loading means for guiding a film strip into said reel, said reel including a central hub member having side members secured to opposite ends thereof which are provided with film receiving grooves on adjacent inner sides thereof extending outwardly spirally from inner entrance portions adjacent said hub to the peripheries thereof, clip means fixed to said hub of the reel between the entrance portions of the grooves for engaging the leading end of a film strip, means on said support releasably engageable with said reel to hold the same against rotation in film engaging position wherein the clip means is positioned to engage the leading end of a film strip extending from said loading means, said loading means including an arm member pivoted for swinging movements relative to said support on an axis spaced from the axis of rotation of said reel having a free end extending towards the axis of rotation of said reel, a guide member for transversely curving a film strip pivoted at its forward end to the free end of said arm member and extending towards the pivotal axis thereof, means for supporting the arm member in film engaging position wherein the guide member is positioned to direct a film passing therethrough to the clip means when the reel is in film engaging position, and means for rotatably supporting a roll of film strip whereby said strip may pass through the guide means into the grooves of the side members of the reel, all adapted and arranged whereby the guide member may swing relative to the arm member while the latter may swing relative to the support for guiding a film strip to the grooves of the reel when said reel is released from film engaging position and rotated for winding up a film strip.

2. Apparatus for processing strips of photographic film comprising in combination, a support, a reel rotatable on said support for receiving and winding up a film strip, loading means for guiding a film strip into said reel, said reel including a central hub member having side members secured to opposite ends thereof which are provided with film receiving grooves on adjacent inner sides thereof extending outwardly spirally from inner entrance portions adjacent said hub to the peripheries thereof, clip means fixed to said hub of the reel between the entrance portions of the grooves for engaging the leading end of a film strip, means on said support releasably engageable with said reel to hold the same against rotation in film engaging position wherein the clip means is positioned to engage the leading end of a film strip extending from said loading means, said loading means including an arm member pivoted for swinging movements relative to said support on an axis spaced from the axis of rotation of said reel having a free end extending towards the axis of rotation of said reel, a guide member for transversely curving a film strip pivoted at its forward end to the free end of said arm member and extending towards the pivotal axis thereof, means for supporting the arm member in film engaging position wherein the guide member is positioned to direct a film passing therethrough to the clip means when the reel is in film engaging position, and means for rotatably supporting a roll of film strip whereby said strip may pass through the guide means into the grooves of the side members of the reel, all adapted and arranged whereby the guide member may swing relative to the arm member while the latter may swing relative to the support for guiding a film strip to the grooves of the reel when said reel is released from film engaging position and rotated for winding up a film strip, said guide member including a transversely curved longitudinal main portion having side portions angularly disposed at the longitudinal side edges thereof.

3. Apparatus for processing strips of photographic film comprising in combination, a support, a reel rotatable on said support for receiving and winding up a film strip, loading means for guiding a film strip into said reel, said reel including a central hub member having side members secured to opposite ends thereof which are provided with film receiving grooves on adjacent inner sides thereof extending outwardly spirally from inner entrance portions adjacent said hub to the peripheries thereof, clip means fixed to said hub of the reel between the entrance portions of the grooves for engaging the leading end of a film strip, means on said support releasably engageable with said reel to hold the same against rotation in film engaging position wherein the clip means is positioned to engage the leading end of a film strip extending from said loading means, said loading means including an arm member pivoted for swinging movements relative to said support on an axis spaced from the axis of rotation of said reel having a free end extending towards the axis of rotation of said reel, a guide member for transversely curving a film strip pivoted at its forward end to the free end of said arm member and extending towards the pivotal axis thereof, means for supporting the arm member in film engaging position wherein the giude member is positioned to direct a film passing therethrough to the clip means when the reel is in film engaging position, and means for rotatably supporting a roll of film strip whereby said strip may pass through the guide means into the grooves of the side members of the reel, all adapted and arranged whereby the guide member may swing relative to the arm member while the latter may swing relative to the support for guiding a film strip to the grooves of the reel when said reel is released from film engaging position and rotated for winding up a film strip, said clip means including a member of spring-like material secured at one end thereof to the central hub member having a free end extending therearound cooperating with the hub to yieldingly engage the end of a film strip therebetween.

HINSDALE SMITH, Jr.